United States Patent
Zushi et al.

(10) Patent No.: US 9,559,620 B2
(45) Date of Patent: Jan. 31, 2017

(54) POWER SUPPLY DEVICE AND METHOD OF CONTROLLING THE SAME

(71) Applicants: Nissan Motor Co., Ltd., Kanagawa (JP); Atsuo Kawamura, Kanagawa (JP)

(72) Inventors: Yusuke Zushi, Tokyo (JP); Takashi Fukushige, Tokyo (JP); Yuichi Shibukawa, Kanagawa (JP); Kensuke Sasaki, Kanagawa (JP); Atsuo Kawamura, Kanagawa (JP)

(73) Assignees: Nissan Motor Co., Ltd., Kanagawa (JP); Atsuo Kawamura, Kanagawa (JP)

( * ) Notice: Subject to any disclaimer, the term of this patent is extended or adjusted under 35 U.S.C. 154(b) by 87 days.

(21) Appl. No.: 14/379,656

(22) PCT Filed: Feb. 22, 2013

(86) PCT No.: PCT/JP2013/054471
§ 371 (c)(1),
(2) Date: Aug. 19, 2014

(87) PCT Pub. No.: WO2013/125672
PCT Pub. Date: Aug. 29, 2013

(65) Prior Publication Data
US 2015/0002057 A1 Jan. 1, 2015

(30) Foreign Application Priority Data
Feb. 23, 2012 (JP) .................... 2012-037636

(51) Int. Cl.
*H02P 1/00* (2006.01)
*H02P 6/00* (2016.01)
(Continued)

(52) U.S. Cl.
CPC ............. *H02P 6/002* (2013.01); *B60L 3/0046* (2013.01); *B60L 7/14* (2013.01); *B60L 11/005* (2013.01);
(Continued)

(58) Field of Classification Search
CPC ............................. B60W 10/08; B60W 20/00
(Continued)

(56) References Cited

U.S. PATENT DOCUMENTS 6,404,151 B1 * 6/2002 Bader .................. B60L 11/005
318/106
7,629,755 B2 * 12/2009 Yaguchi .............. B60L 11/1803
318/139
(Continued)

FOREIGN PATENT DOCUMENTS

| JP | 2002-330545 A | 11/2002 |
| JP | 2004-15895 A | 1/2004 |
| JP | 2005-20824 A | 1/2005 |

OTHER PUBLICATIONS

International Search Report for corresponding International Application No. PCT/JP2013/054471, mailed May 21, 2013 (1 page).
(Continued)

*Primary Examiner* — Rina Duda
(74) *Attorney, Agent, or Firm* — Osha Liang LLP (57) ABSTRACT

A power supply device has a first power supply capable of storing and discharging electric power, a second power supply connected in series to the first power supply and capable of storing and discharging the electric power, an isolated DC-DC converter including a primary side terminal to which the first power supply is connected, and a secondary side terminal to which the second power supply is connected, and a power supply control unit that controls a voltage of the second power supply using the isolated
(Continued)

US 9,559,620 B2

Page 2

DC-DC converter. A direct-current voltage outputted from the first power supply and the second power supply connected in series is inputted to a first inverter, converted into an alternating-current voltage by the first inverter, and then supplied to a vehicle drive motor.

10 Claims, 5 Drawing Sheets (51) Int. Cl.
*H02M 3/335* (2006.01)
*B60L 3/00* (2006.01)
*B60L 7/14* (2006.01)
*B60L 11/00* (2006.01)
*B60L 11/18* (2006.01)
*B60L 15/00* (2006.01)
*H02M 1/00* (2006.01)

(52) U.S. Cl.
CPC .......... *B60L 11/1803* (2013.01); *B60L 15/007* (2013.01); *H02M 3/33576* (2013.01); *H02P 6/28* (2016.02); *B60L 2210/10* (2013.01); *B60L 2240/547* (2013.01); *B60L 2240/549* (2013.01); *H02M 2001/0093* (2013.01); *Y02T 10/645* (2013.01); *Y02T 10/7005* (2013.01); *Y02T 10/7022* (2013.01); *Y02T 10/7216* (2013.01)

(58) Field of Classification Search
USPC .......................................... 318/139, 800, 801
See application file for complete search history.

(56) References Cited

U.S. PATENT DOCUMENTS

| 2012/0007530 A1* | 1/2012 | Imai ...................... H02M 7/003 318/400.25 |
| 2012/0020126 A1 | 1/2012 | Moki |
| 2012/0153878 A1* | 6/2012 | King ................... B60L 11/1803 318/139 |

OTHER PUBLICATIONS

Pavlovsky, M., et al.; "A ZVS, Quasi-ZCS converter with an improved power rating for 14/42V automotive application"; 2003 IEEE 34th Annual Power Electronics Specialists Conference; Acapulco, Mexico; Jun. 15-19, 2003; pp. 628-633 (6 pages).

* cited by examiner

POWER SUPPLY DEVICE AND METHOD OF CONTROLLING THE SAME

BACKGROUND

Technical Field

The present invention relates to a power supply device configured to supply electric power to a vehicle drive motor, and a method of controlling the same.

Related Art

Techniques for enabling power supply devices, which are used in vehicles such as electric vehicles (EV) and hybrid electric vehicles (HEV), to effectively collect electric power regenerated by vehicle drive motors have heretofore been proposed (see Patent Literature 1, for example.)

A power supply device of Patent Literature 1 includes a switch configured to switch between a state where a capacitor and a battery that can store and discharge electric power are connected in series to an inverter and a state where only the battery is connected to the inverter. When a voltage of the capacitor is lower than a predetermined value, regenerated electric power is supplied to both the battery and the capacitor by connecting the battery and the capacitor in series. When the voltage of the capacitor is higher than the predetermined value, the regenerated electric power is supplied only to the battery by connecting the battery only.

CITATION LIST

Patent Literature

Patent Literature 1: Japanese Patent Application Publication No. 2002-330545

SUMMARY OF INVENTION

However, according to Patent Literature 1, the voltage of the capacitor runs out earlier than that of the battery when the vehicle continues power running, and the vehicle drive motor has to be driven thereafter only by using the electric power from the battery. Hence, there has been an increase in size of the inverter, because the inverter has to use semiconductor elements with large electric capacity in order to ensure a maximum output value of the vehicle drive motor even when a state of charge of the battery is at low level.

One or more embodiments of the present invention provides a power supply device and a method of controlling the same, which are capable of reducing an inverter in size by maintaining a high direct-current voltage to be inputted to the inverter and thus reducing current capacity of semiconductor elements used in the inverter.

A power supply device of a first aspect of the present invention includes: a first power supply capable of storing and discharging electric power; a second power supply connected in series to the first power supply and capable of storing and discharging the electric power; an isolated DC-DC converter including primary side terminals to which the first power supply is connected, and secondary side terminals to which the second power supply is connected; and a power supply control unit configured to control a voltage of the second power supply using the isolated DC-DC converter. A direct-current voltage outputted from the first power supply and the second power supply connected in series is inputted to a first inverter, converted into an alternating-current voltage by the first inverter, and then supplied to a vehicle drive motor.

A method of controlling a power supply device of a second aspect of the present invention is a method of controlling a power supply device which includes the first power supply, the second power supply and the isolated DC-DC converter, and in which a direct-current voltage outputted from the first power supply and the second power supply connected in series is inputted to a first inverter, converted into an alternating-current voltage by the first inverter, and then supplied to a vehicle drive motor. The method includes controlling a voltage of the second power supply using the isolated DC-DC converter.

BRIEF DESCRIPTION OF DRAWINGS

FIG. 2 is a graph showing how a direct-current voltage Vdc and a first power supply voltage Vbat changes with time in accordance with procedures shown in FIG. 1 for a power supply control unit 4 to control an isolated DC-DC converter 3a.

FIG. 3 is a flowchart showing an example of the procedures for the power supply control unit 4 of FIG. 1 to control the isolated DC-DC converter 3a.

DETAILED DESCRIPTION

Embodiments of the present invention will be described below with reference to the drawings. In the descriptions of the drawings, the same components are denoted by the same reference signs. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Configuration of Power Supply Device

Figure 1:
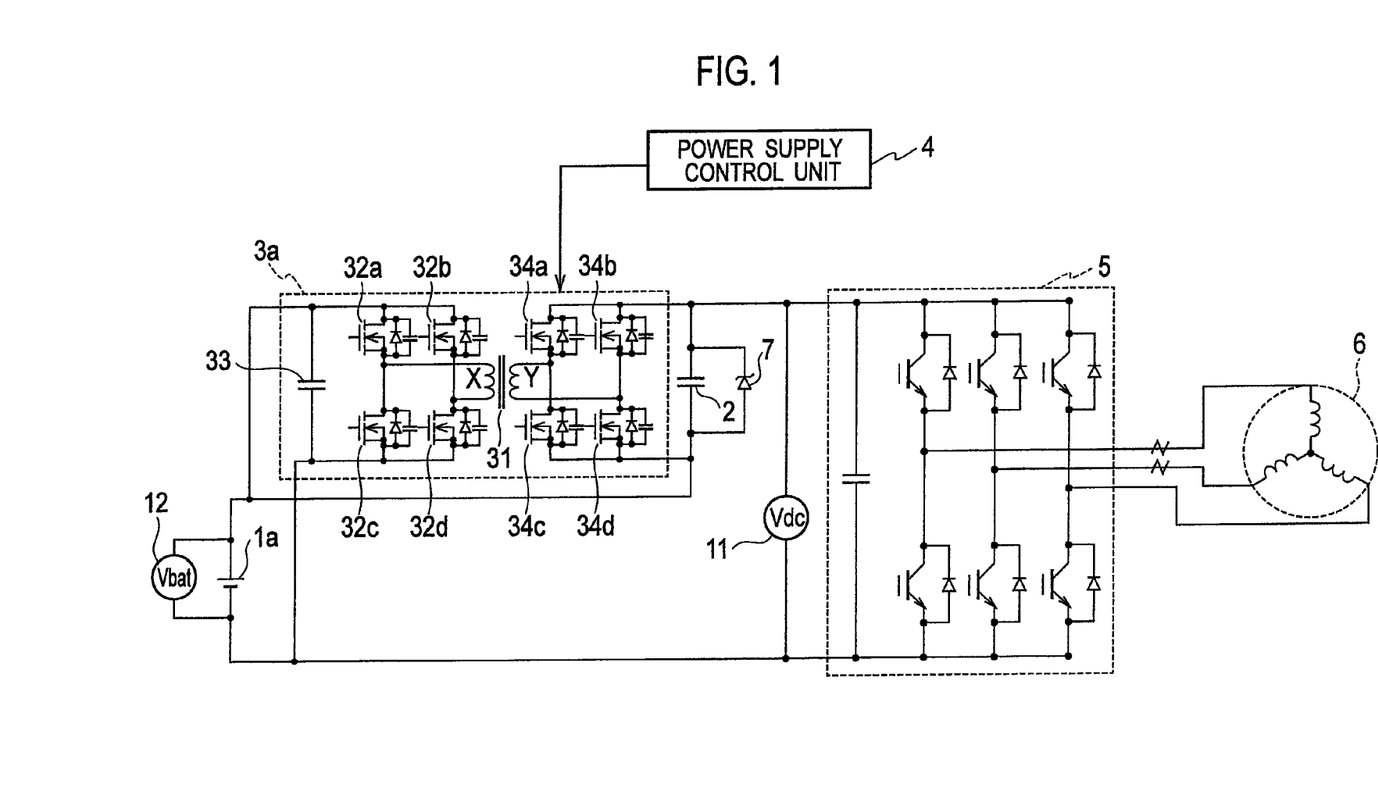
FIG. 1 is a circuit diagram showing a configuration of a power supply device according to a first embodiment of the present invention, together with a first inverter 5 and a vehicle drive motor 6 which are connected to the power supply device.

A configuration of a power supply device according to a first embodiment, and a first inverter 5 and a vehicle drive motor 6 connected to the power supply device will be described with reference to FIG. 1. The power supply device according to the first embodiment includes: a first power supply 1a capable of storing and discharging electric power; a second power supply 2 connected in series to the first power supply 1a and capable of storing and discharging the electric power; an isolated DC-DC converter 3a having primary side terminals connected to the first power supply 1a and secondary side terminals connected to the second power supply 2; and a power supply control unit 4 configured to control a voltage of the second power supply 2 using the isolated DC-DC converter 3a. In this specification, the term "connection" means electrical connection but not mechanical connection.

A positive electrode of the first power supply 1a is connected to one terminal of the second power supply 2. A negative electrode of the first power supply 1a and the other terminal of the second power supply 2 are connected respectively to a pair of direct-current side terminals of the first inverter 5. Accordingly, a direct-current voltage Vdc outputted from the first power supply 1a and the second power supply 2, which are connected in series, is inputted to the direct-current side terminals of the first inverter 5. The first inverter 5 includes switching elements provided to upper and lower arms. The first inverter 5 performs PWM control for turning the switching elements on and off, thereby converting the direct-current voltage Vdc into a three-phase alternating-current voltage. Alternating-current side terminals of the first inverter 5 are connected to the vehicle drive motor 6. Thus, the direct-current voltage Vdc, which is outputted from the first power supply 1a and the second power supply 2 connected in series, is converted into the three-phase alternating-current voltage by the first inverter 5 and is then supplied to the vehicle drive motor 6. The vehicle drive motor 6 is driven by the three-phase alternating-current voltage. Thus, the vehicle drive motor 6 can make a vehicle run.

Electric storage elements capable of storing and discharging electric power may be applicable to the first power supply 1a and the second power supply 2. Examples of the electric storage elements include: batteries (secondary cells) including lithium (Li)-ion batteries and nickel metal hydride batteries; and capacitance elements including electric double-layer capacitors, Li-ion capacitors, and other capacitors. The first embodiment describes a case where a lithium (Li) ion battery is used as the first power supply 1a while a capacitor is used as the second power supply 2.

The power supply device further includes: a direct-current voltage measurement unit 11 configured to measure the direct-current voltage Vdc, which is outputted from the first power supply 1a and the second power supply 2 connected in series; and a first power supply voltage measurement unit 12 configured to measure a first power supply voltage Vbat, which is outputted from the first power supply 1a. Values of the direct-current voltage Vdc and the first power supply voltage Vbat measured respectively by the direct-current voltage measurement unit 11 and the first power supply voltage measurement unit 12 are transmitted to the power supply control unit 4.

The isolated DC-DC converter 3a includes the pair of primary side terminals and the pair of secondary side terminals. The primary side terminals of the isolated DC-DC converter 3a are respectively connected to the positive electrode and the negative electrode of the first power supply 1a, and the secondary side terminals thereof are respectively connected to the two terminals of the second power supply 2. The isolated DC-DC converter 3a further includes an isolated transformer 31, switching elements 32a to 32d constituting a primary side full bridge circuit, switching elements 34a to 34d constituting a secondary side full bridge circuit, and a input side smoothing capacitor 33. A transformation ratio between the primary side and the secondary side of the isolated DC-DC converter is X:Y. In other words, the transformation ratio of the isolated transformer 31 is expressed with primary side:secondary side=X:Y. The primary side full bridge circuit is connected to the primary side of the isolated transformer 31, and the secondary side full bridge circuit is connected to the secondary side of the isolated transformer 31.

The isolated DC-DC converter 3a further includes capacitors, which are respectively connected in parallel with the switching elements 32a to 32d and 34a to 34d constituting the primary side and secondary side full bridge circuits. Thus, the isolated DC-DC converter 3a can perform soft switching.

The power supply device further includes a Zener diode 7 which is connected in parallel with the second power supply 2. In the case where the isolated DC-DC converter 3a stops its operation in an open mode, if the vehicle drive motor 6 is performing a regenerating operation, the Zener diode 7 is brought into a breakdown before the second power supply 2 exceeds its withstand voltage due to an overcharge of the second power supply 2. Thus, it is possible to suppress a failure of the second power supply 2. On the other hand, if the vehicle is power running, it is possible to operate the Zener diode 7 as a current path that does not pass through the second power supply 2.

The power supply control unit 4 switches between on-state and off-state of the isolated DC-DC converter 3a by individually controlling switching operations of the switching elements 32a to 32d and 34a to 34d constituting the primary side and secondary side full bridge circuits. When the isolated DC-DC converter 3a is in on-state, the power supply control unit 4 alternately turns on and off the switching elements 32a to 32d diagonally located in the primary side full bridge circuit at a duty ratio of 50%. Specifically, the power supply control unit 4 turns on the switching element 32a and the switching element 32d, and turns off the switching element 32b and the switching element 32c. Then, the power supply control unit 4 turns off the switching element 32a and the switching element 32d, and turns on the switching element 32b and the switching element 32c. The power supply control unit 4 repeats the above-described operations alternately. Regarding the secondary side full bridge circuit, similarly, the power supply control unit 4 turns on and off the diagonally located switching elements 34a to 34d alternately at a duty ratio of 50%. Here, the same switching frequency is applied to the primary side and the secondary side, and a phase difference ☐ is provided between carrier phases on the primary side and the secondary side. At this time, electric power (transmission power P) transmitted from the primary side to the secondary side is expressed with Formula (1), in which $E_1$ denotes the first power supply voltage Vbat, $E_2$ denotes a second power supply voltage Vcap, $\omega$ denotes the switching frequency of the isolated DC-DC converter 3a, and L denotes a leakage inductance of the isolated transformer 31:

[Formula 1]

$$p = \frac{E_1 E_2}{\omega L} \phi \left(1 - \frac{\phi}{\pi}\right). \tag{1}$$

It is desirable that the isolated DC-DC converter 3a be a bidirectional isolated DC-DC converter capable of transmitting the electric power in two directions between the primary side and the secondary side. This makes it possible not only to increase but also to reduce the voltage of the second power supply 2.

On the other hand, when the isolated DC-DC converter 3a is in off-state, the power supply control unit 4 performs control in such a way that all the switching elements 32a to 32d and 34a to 34d of the primary and secondary full bridge circuits are always off. At this time, no electric current flows on the primary side full bridge circuit, and an output voltage of the secondary side full bridge circuit is 0. The electric power (the transmission power P) transmitted from the primary side to the secondary side is 0.

In the meantime, the power supply control unit 4 switches between the on-state and the off-state of the isolated DC-DC converter 3a on the basis of voltage values measured by the direct-current voltage measurement unit 11 and the first power supply voltage measurement unit 12. Details will be described later with reference to FIG. 2 and FIG. 3. Here, the power supply control unit 4 is realized by: installing a computer program, which describes control procedures to be explained later, on an information processing device such as a microcomputer provided with a processing unit, a storage unit, and a communication control unit; and executing the computer program by using the information processing device.

[Method of Controlling Power Supply Device]

Figure 3:
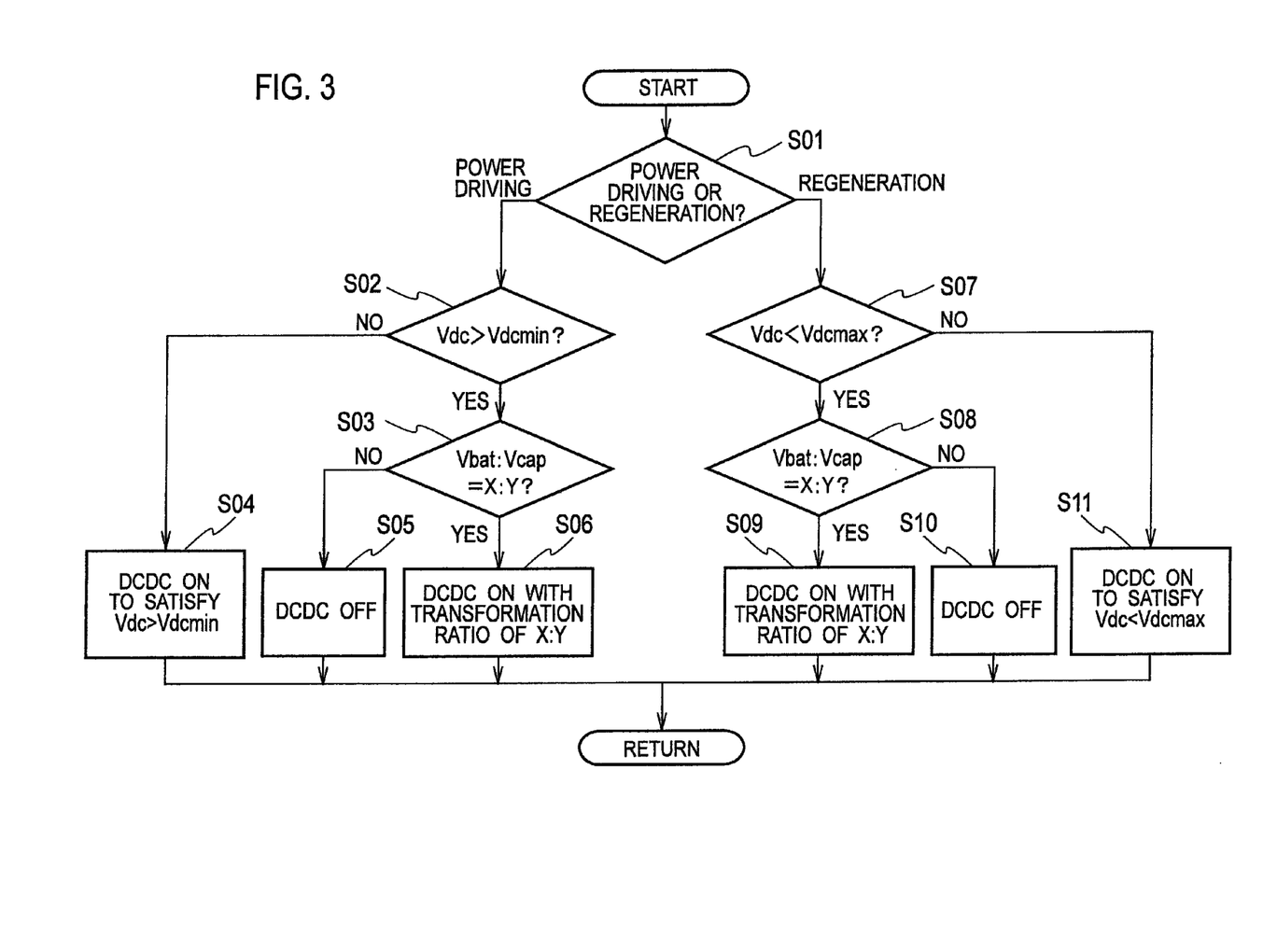

An example of procedures for the power supply control unit 4 in FIG. 1 to control the isolated DC-DC converter 3a will be described with reference to FIG. 3. Note that the processing of FIG. 3 is to be repeatedly performed at a predetermined cycle.

First, in step S01, the power supply control unit 4 judges whether the vehicle drive motor 6 is performing a regenerating operation or a power running operation. For example, the power supply unit 4 may judge that the vehicle drive motor 6 is performing the power running operation if the first power supply voltage Vbat measured by the first power supply voltage measurement unit 12 is in a downward trend, and judge that the vehicle drive motor 6 is performing the regenerating operation if the first power supply voltage Vbat is in an upward trend. In the meantime, the power supply control unit 4 may make a judgment on the basis of a signal indicating either the power running operation or the regenerating operation, which is outputted from either the first inverter 5 or the vehicle drive motor 6.

The process proceeds to step S02 when it is judged that the vehicle drive motor 6 is performing the power running operation. Here, the power supply control unit 4 judges whether or not the direct-current voltage Vdc measured by the direct-current voltage measurement unit 11 is greater than a lower limit Vdcmin acceptable by the first inverter 5. The process proceeds to step S04 when it is judged that the direct-current voltage Vdc is not greater than the lower limit Vdcmin (NO in S02). Here, the power supply control unit 4 controls the second power supply voltage Vcap of the second power supply 2 using the isolated DC-DC converter 3a in order that the direct-current voltage Vdc becomes greater than the lower limit Vdcmin. For example, the power supply control unit 4 controls the isolated DC-DC converter 3a in such a way as to establish the on-state, thereby transmitting the electric power from the first power supply 1a connected to the primary side to the second power supply 2 connected to the secondary side. Thus, the second power supply voltage Vcap of the second power supply 2 is increased, and the direct-current voltage Vdc is also increased to a level greater than the lower limit Vdcmin.

The process proceeds to step S03 when it is judged that the direct-current voltage Vdc is greater than the lower limit Vdcmin (YES in S02). Here, the power supply control unit 4 judges whether or not a ratio between the first power supply voltage Vbat of the first power supply 1a and the second power supply Vcap of the second power supply 2 is equal to the transformation ratio (=X:Y) between the primary side and the secondary side of the isolated DC-DC converter 3a. The process proceeds to step S06 when it is judged that Vbat:Vcap is equal to X:Y (YES in S03). Here, the power supply control unit 4 controls the second power supply voltage Vcap using the isolated DC-DC converter 3a. Thus, it is possible to cause the switching elements 32a to 32d and 34a to 34d of the isolated DC-DC converter 3a to perform soft switching operations. As a consequence, switching losses are reduced and power running efficiency is improved. Note that the second power supply voltage Vcap can be obtained by subtracting the first power supply voltage Vbat from the direct-current voltage Vdc.

The process proceeds to step S05 when it is judged that Vbat:Vcap is not equal to X:Y (NO in S03). Here, the power supply control unit 4 controls the isolated DC-DC converter 3a in order to establish the off-state.

On the other hand, the process proceeds to step S07 when it is judged that the vehicle drive motor 6 is performing the regenerating operation. Here, the power supply control unit 4 judges whether or not the direct-current voltage Vdc measured by the direct-current voltage measurement unit 11 is smaller than an upper limit Vdcmax acceptable by the first inverter 5. The process proceeds to step S11 when it is judged that the direct-current voltage Vdc is not smaller than the upper limit Vdcmax (NO in S07). Here, the power supply control unit 4 controls the second power supply voltage Vcap using the isolated DC-DC converter 3a in order that the direct-current voltage Vdc becomes smaller than the upper limit Vdcmax. For example, the power supply control unit 4 controls the isolated DC-DC converter 3a in such a way as to establish the on-state, thereby transmitting the electric power from the second power supply 2 connected to the secondary side to the first power supply 1a connected to the primary side. Thus, the second power supply voltage Vcap is reduced, and the direct-current voltage Vdc is also reduced to a level smaller than the upper limit Vdcmax.

The process proceeds to step S08 when it is judged that the direct-current voltage Vdc is smaller than the upper limit Vdcmax (YES in S07). Here, the power supply control unit 4 executes the same processing as step S03 described above. The process proceeds to step S09 when it is judged that Vbat:Vcap is equal to X:Y (YES in S08). Here, the power supply control unit 4 executes the same processing as step S06 described above. Thus, it is possible to cause the switching elements 32a to 32d and 34a to 34d of the isolated DC-DC converter 3a to perform soft switching operations. As a consequence, switching losses are reduced and regeneration efficiency is improved.

The process proceeds to step S10 when it is judged that Vbat:Vcap is not equal to X:Y (NO in S08). Here, the power supply control unit 4 controls the isolated DC-DC converter 3a in order to establish the off-state.

After each of steps S04 to S06 and steps S09 to S11, the process returns to step S01 again.

Figure 2:
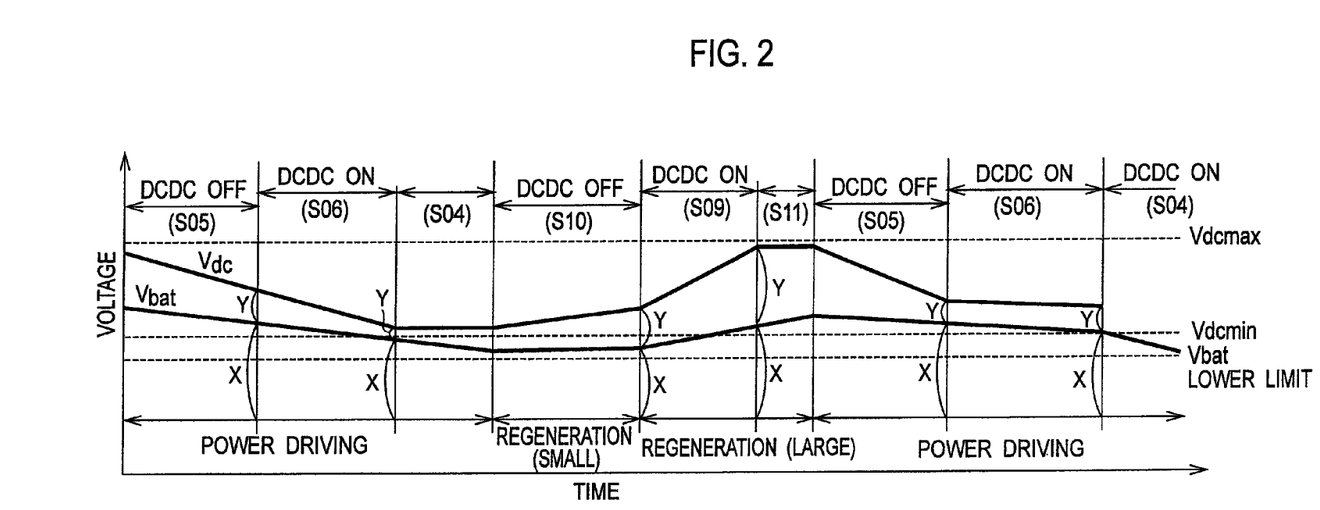

With reference to FIG. 2, descriptions will be provided for how the direct-current voltage Vdc and the first power supply voltage Vbat change with time in accordance with the procedures shown in FIG. 3 for the power supply control unit 4 to control the isolated DC-DC converter 3a.

First, in a power running state, both of the direct-current voltage Vdc outputted from the first power supply 1a as well as the second power supply 2 connected in series and the first power supply voltage Vbat outputted from the first power supply 1a are reduced as time passes. When the direct-current voltage Vdc is greater than the lower limit Vdcmin, the isolated DC-DC converter 3a is controlled in order to establish the off-state. In other words, the power supply control unit 4 does not control the second power supply voltage Vcap using the isolated DC-DC converter 3a (S05 in FIG. 3). Here, notations of S04 to S06 and S09 to S11 in FIG. 2 correspond to the contents of the processing in the flowchart of FIG. 3.

When Vbat:Vcap becomes equal to X:Y in the power running state, the power supply control unit 4 starts controlling the second power supply voltage Vcap using the isolated DC-DC converter 3a by switching the isolated DC-DC converter 3a to the on-state (S06 in FIG. 3).

When the direct-current voltage Vdc comes close to the lower limit Vdcmin, the power supply control unit 4 controls the second power supply voltage Vcap using the isolated DC-DC converter 3a in order that the direct-current voltage Vdc does not become equal to or below the lower limit Vdcmin (S04 in FIG. 3).

Next, with a transition from the power running state to a regenerating state, the first power supply 1a and the second power supply 2 connected in series are charged with the regenerated electric power. Accordingly, the direct-current voltage Vdc and the first power supply voltage Vbat are increased as time passes. When the direct-current voltage Vdc is smaller than the upper limit Vdcmax, the isolated DC-DC converter 3a is controlled in order to establish the off-state. In other words, the power supply control unit 4 does not control the second power supply voltage Vcap using the isolated DC-DC converter 3a (S10 in FIG. 3).

When Vbat:Vcap becomes equal to X:Y in the regenerating state, the power supply control unit 4 starts controlling the second power supply voltage Vcap using the isolated DC-DC converter 3a by switching the isolated DC-DC converter 3a to the on-state (S09 in FIG. 3).

When the direct-current voltage Vdc comes close to the upper limit Vdcmax, the power supply control unit 4 controls the second power supply voltage Vcap using the isolated DC-DC converter 3a in order that the direct-current voltage Vdc does not become equal to or above the upper limit Vdcmax (S11 in FIG. 3). Specifically, the electric power is transmitted from the second power supply 2 connected to the secondary side to the first power supply 1a connected to the primary side. Thus, the second power supply voltage Vcap is reduced, and the direct-current voltage Vdc is also reduced to a level smaller than the upper limit Vdcmax.

The above-described processing is repeatedly executed with a transition again from the regenerating state to the power running state.

As described above, the first embodiment of the present invention can achieve the following operation and effect.

The first power supply 1a and the second power supply 2 each capable of storing and discharging the electric power are connected in series. The first power supply 1a is connected to the primary side terminals of the isolated DC-DC converter 3a. The power supply control unit 4 connects the second power supply 2 to the secondary side terminals of the isolated DC-DC converter 3a, and controls the voltage (the second power supply voltage Vcap) of the second power supply 2 using the isolated DC-DC converter 3a. The direct-current voltage Vdc outputted from the first power supply 1a and the second power supply 2 connected in series is inputted to the first inverter 5, converted into the alternating-current voltage by the first inverter 5, and then supplied to the vehicle drive motor 6. Even when a state of charge of the first power supply 1a is at low level, the high direct-current voltage Vdc can be maintained by controlling the second power supply voltage Vcap using the isolated DC-DC converter 3a. Thus, it is possible to reduce current capacity of the semiconductor elements used in the first inverter 5 and to reduce the first inverter 5 in size.

When the vehicle performs power running by use of the vehicle drive motor 6, the power supply control unit 4 does not control the second power supply voltage Vcap using the isolated DC-DC converter 3a if the direct-current voltage Vdc is greater than the lower limit Vdcmin acceptable by the first inverter 5. The isolated DC-DC converter 3a is not operated when the direct-current voltage Vdc is greater than the lower limit Vdcmin in the power running state. Thus, the power running efficiency is improved.

When the vehicle performs power running by use of the vehicle drive motor 6, the power supply control unit 4 controls the second power supply voltage Vcap in such a way that the direct-current voltage Vdc does not fall below the lower limit Vdcmin. Thus, the lower limit Vdcmin of the direct-current voltage Vdc is ensured and the power running efficiency is improved.

When the vehicle drive motor 6 regenerates the electric power, the power supply control unit 4 does not control the second power supply voltage Vcap using the isolated DC-DC converter 3a if the direct-current voltage Vdc is smaller than the upper limit Vdcmax acceptable by the first inverter 5. The isolated DC-DC converter 3a is not operated when the direct-current voltage Vdc is smaller than the upper limit Vdcmax in the regenerating state. Thus, the regeneration efficiency is improved.

When the vehicle drive motor 6 regenerates the electric power, the power supply control unit 4 controls the second power supply voltage Vcap in order that the direct-current voltage Vdc does not exceed the upper limit Vdcmax. Thus, destruction of the semiconductor elements included in the first inverter 5 is suppressed, and operational stability is improved.

The isolated DC-DC converter 3a is the bidirectional isolated DC-DC converter which can transmit the electric power in two directions between the primary side and the secondary side. Since the bidirectional isolated DC-DC converter has high power conversion efficiency, unnecessary power consumption by the isolated DC-DC converter 3a is suppressed and efficiency for controlling the second power supply voltage Vcap is improved.

When the transformation ratio between the primary side and the secondary side of the isolated DC-DC converter 3a is X:Y, the power supply control unit 4 starts controlling the second power supply voltage Vcap using the isolated DC-DC converter 3a if the ratio between the first power supply voltage Vbat and the second power supply voltage Vcap becomes equal to X:Y. Since it is possible to cause the isolated DC-DC converter 3a to perform the soft switching operations, unnecessary power consumption by the isolated DC-DC converter 3a is suppressed and efficiency for controlling the second power supply voltage Vcap is improved.

The second power supply 2 is a capacitance element, and the power supply device further includes the Zener diode 7 which is connected in parallel with the capacitance element. Thus, the power supply device 7 can improve safety by inhibiting an overvoltage from being applied to the capacitance element in case of a failure of the isolated DC-DC converter 3a in the open mode.

Second Embodiment

Figure 4:
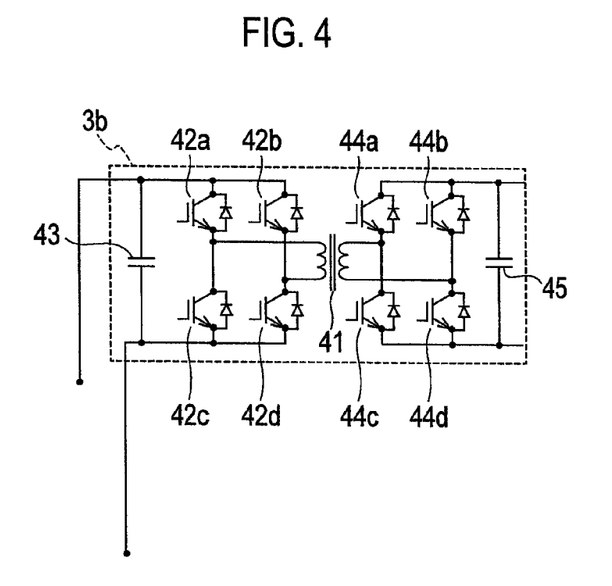
FIG. 4 is a circuit diagram showing a configuration of an isolated DC-DC converter 3b according to a second embodiment.

A configuration of an isolated DC-DC converter 3b according to a second embodiment will be described with reference to FIG. 4. As shown in FIG. 1, the first embodiment has described the example of the isolated DC-DC converter 3a using MOS field-effect transistors as the switching elements 32a to 32d and 34a to 34d. However, the switching elements 32a to 32d and 34a to 34d are not limited to the MOS field-effect transistors. For example, bipolar transistors are also applicable thereto. As shown in FIG. 4, a power supply device according to the second embodiment includes the isolated DC-DC converter 3b, which uses bipolar transistors as switching elements 42a to 42d and 44a to 44d. In addition, the isolated DC-DC converter 3b is different from the isolated DC-DC converter 3a in that the isolated DC-DC converter 3b further includes a smoothing capacitor 45 on the secondary side. The other features including the configuration of the primary side and secondary side full bridge circuits and a transformation ratio of an isolated transformer 41 are the same as those in the first embodiment and descriptions thereof will be omitted.

Third Embodiment

Figure 5:
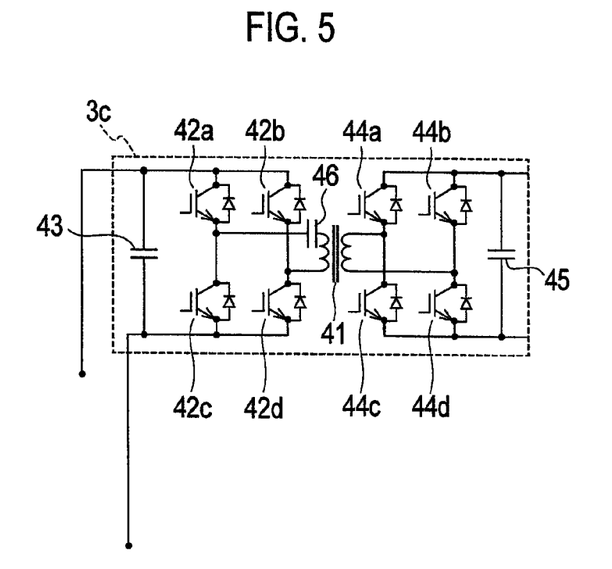
FIG. 5 is a circuit diagram showing a configuration of an isolated DC-DC converter 3c according to a third embodiment.

As shown in FIG. 5, an isolated DC-DC converter 3c according to a third embodiment has a configuration in which a resonance capacitor 46 is connected to the primary side of the isolated transformer 41. This enables the switching elements 42a to 42d on the primary side to perform soft switching operations, and thereby to reduce switching losses. The other features are the same as those in FIG. 4 and descriptions thereof will be omitted.

Fourth Embodiment

Figure 6:
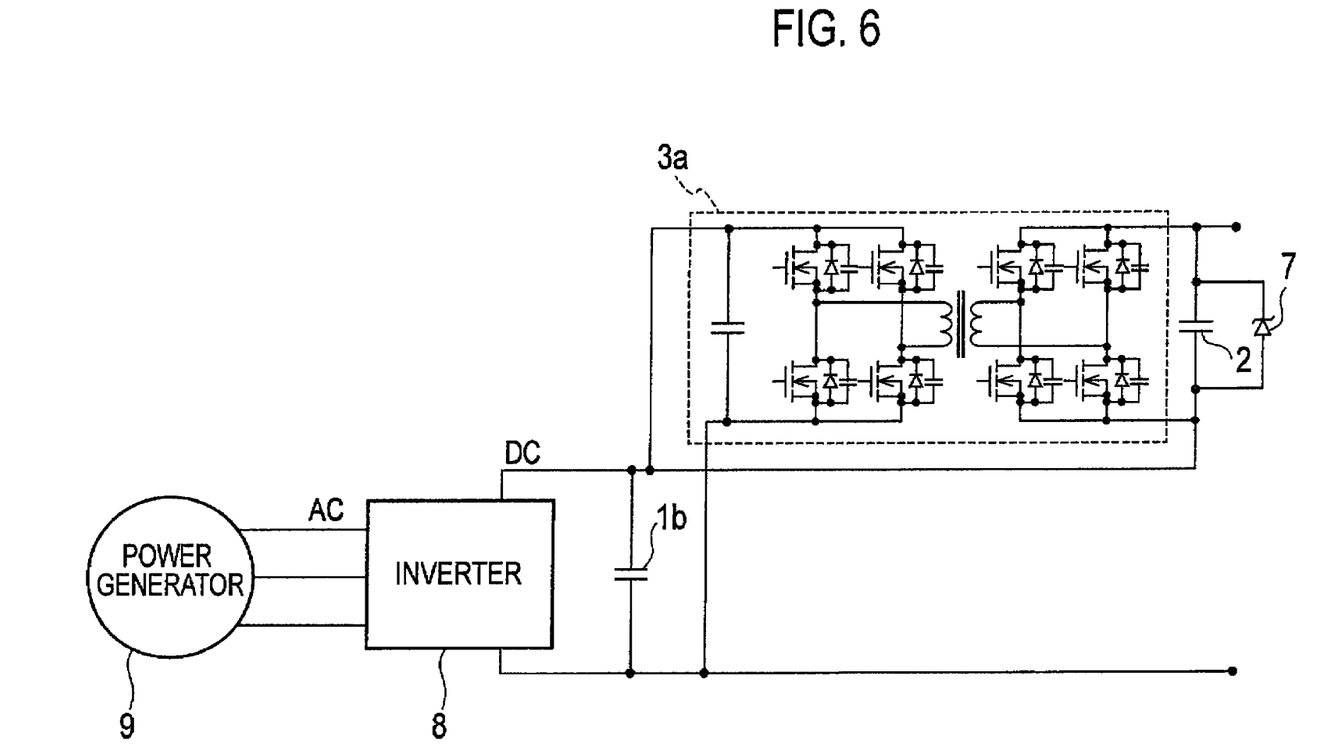
FIG. 6 is a circuit diagram showing a configuration of a power supply device according to a fourth embodiment.

A configuration of a power supply device according to a fourth embodiment will be described with reference to FIG. 6. The power supply device according to the fourth embodiment is different from the power supply device shown in FIG. 1 in that the power supply device of the fourth embodiment further includes a second inverter 8 whose direct-current-side terminals are connected to a first power supply 1b, and a power generator 9 to which alternating-current-side terminals of the second inverter 8 are connected. Other features are the same and descriptions thereof will be omitted.

The first power supply 1b is not a battery such as a lithium (Li)-ion battery, but is formed from a capacitance element such as an electric double-layer capacitor, a Li-ion capacitor, and other capacitors. The power supply control unit 4 monitors a state of charge of the first power supply 1b through the first power supply voltage Vbat. When the state of charge of the first power supply 1b becomes low, the power supply control unit 4 activates the power generator 9, converts the generated alternating-current power into direct-current power using the second inverter 8, and charges the first power supply 1b. By supplying the electric power generated by the power generator 9 to the first power supply 1b through the second inverter 8 as described above, it is possible to suppress a drop in the state of charge of the first power supply 1b, and to maintain the high direct-current voltage Vdc to be inputted to the first inverter 5.

The entire contents of Japanese Patent Application No. 2012-037636 (filing date: Feb. 23, 2012) are incorporated herein.

Although the contents of the present invention have been described above with the embodiments, it is obvious to those skilled in the art that the present invention is not limited only to these descriptions, and various modifications and improvements are possible.

INDUSTRIAL APPLICABILITY

The power supply device of any of the embodiments can maintain the high direct-current voltage to be inputted to the first inverter 5. Thus, the power supply device can reduce the current capacity of the semiconductor elements used in the first inverter 5, and thus reduce the first inverter 5 in size. The present invention therefore has industrial applicability.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

Vbat first power supply voltage
Vcap second power supply voltage
Vdc direct-current voltage
Vdcmax upper limit
Vdcmin lower limit
1a, 1b first power supply
2 second power supply
3a to 3c isolated DC-DC converter
4 power supply control unit
5 first inverter
6 vehicle drive motor
7 Zener diode
8 second inverter
9 power generator

The invention claimed is:

1. A power supply device comprising:
a first power supply capable of storing and discharging electric power;
a second power supply connected in series to the first power supply and capable of storing and discharging the electric power;
an isolated DC-DC converter including a primary side terminal to which the first power supply is connected, and a secondary side terminal to which the second power supply is connected; and
a power supply control unit that controls a voltage of the second power supply using the isolated DC-DC converter,
wherein a sum of a direct voltage outputted from the first power supply and the second power supply connected in series is inputted to a first inverter, converted into an alternating-current voltage by the first inverter, and then supplied to a vehicle drive motor, and
wherein, when a vehicle performs power running by use of the vehicle drive motor, the power supply control unit controls the isolated DC-DC converter in order to establish off-state if the sum of the direct voltage is greater than a lower limit acceptable by the first inverter.

2. The power supply device according to claim 1,
wherein, when the vehicle performs power running by use of the vehicle drive motor, the power supply control unit controls the voltage of the second power supply in order that the sum of the direct voltage does not fall below the lower limit.

3. The power supply device according to claim 1,
wherein the isolated DC-DC converter is a bidirectional isolated DC-DC converter capable of transmitting the electric power in two directions between the primary side and the secondary side.

4. The power supply device according to claim 1,
wherein, assuming that a transformation ratio between the primary side and the secondary side of the isolated DC-DC converter is X:Y, the power supply control unit starts controlling the voltage of the second power supply using the isolated DC-DC converter when a ratio between a voltage of the first power supply and the voltage of the second power supply becomes equal to X:Y.

5. The power supply device according to claim 1,
wherein the second power supply is a capacitance element, and
wherein the power supply device further comprises a Zener diode connected in parallel with the capacitance element.

6. The power supply device according to claim 1, further comprising:
a second inverter whose direct-current-side terminal is connected to the first power supply; and
a power generator to which an alternating-current-side terminal of the second inverter is connected.

7. A power supply device comprising:
a first power supply capable of storing and discharging electric power;
a second power supply connected in series to the first power supply and capable of storing and discharging the electric power;
an isolated DC-DC converter including a primary side terminal to which the first power supply is connected, and a secondary side terminal to which the second power supply is connected; and
a power supply control unit that controls a voltage of the second power supply using the isolated DC-DC converter,
wherein a sum of a direct voltage outputted from the first power supply and the second power supply connected in series is inputted to a first inverter, converted into an alternating-current voltage by the first inverter, and then supplied to a vehicle drive motor, and
wherein, when the vehicle drive motor regenerates electric power, the power supply control unit controls the isolated DC-DC converter in order to establish off-state if the sum of the direct voltage is smaller than an upper limit acceptable by the first inverter.

8. The power supply device according to claim 7,
wherein, when the vehicle drive motor regenerates the electric power, the power supply control unit controls the voltage of the second power supply in order that the sum of the direct voltage does not exceed the upper limit.

9. A method of controlling a power supply device provided with
a first power supply capable of storing and discharging electric power,
a second power supply connected in series to the first power supply and capable of storing and discharging the electric power, and
an isolated DC-DC converter including a primary side terminal to which the first power supply is connected, and a secondary side terminal to which the second power supply is connected,
wherein a sum of a direct voltage outputted from the first power supply and the second power supply connected in series is inputted to a first inverter, converted into an alternating-current voltage by the first inverter, and then supplied to a vehicle drive motor,
wherein the method comprises:
controlling a voltage of the second power supply using the isolated DC-DC converter; and
when a vehicle performs power running by use of the vehicle drive motor, controlling the isolated DC-DC converter in order to establish off-state if the sum of the direct voltage is greater than a lower limit acceptable by the first inverter.

10. A method of controlling a power supply device provided with
a first power supply capable of storing and discharging electric power,
a second power supply connected in series to the first power supply and capable of storing and discharging the electric power, and
an isolated DC-DC converter including a primary side terminal to which the first power supply is connected, and a secondary side terminal to which the second power supply is connected,
wherein a sum of a direct voltage outputted from the first power supply and the second power supply connected in series is inputted to a first inverter, converted into an alternating-current voltage by the first inverter, and then supplied to a vehicle drive motor,
wherein the method comprises:
controlling a voltage of the second power supply using the isolated DC-DC converter; and
when the vehicle drive motor regenerates electric power, controlling the isolated DC-DC converter in order to establish off-state if the sum of the direct voltage is smaller than an upper limit acceptable by the first inverter.

* * * * *